United States Patent [19]

Miller et al.

[11] Patent Number: 5,039,325
[45] Date of Patent: Aug. 13, 1991

[54] METHOD FOR CONSOLIDATING DOPED GLASS USING AN ENCAPSULATING STRUCTURE

[75] Inventors: Thomas J. Miller, Alpharetta, Ga.; Douglas W. Monroe, Newtown, Pa.; David A. Nicol, Trenton, N.J.; David B. Steele, Buckingham, Pa.

[73] Assignee: AT&T Bell Laboratories, Murray Hill, N.J.

[21] Appl. No.: 535,611

[22] Filed: Jun. 11, 1990

Related U.S. Application Data

[62] Division of Ser. No. 459,605, Jan. 2, 1990, Pat. No. 4,968,339.

[51] Int. Cl.$^5$ .............................................. C03C 25/02
[52] U.S. Cl. ........................................ 65/3.12; 65/18.2; 65/DIG. 16
[58] Field of Search .................. 65/3.12, 3.14, 3.15, 65/18.2, DIG. 16

[56] References Cited

U.S. PATENT DOCUMENTS

| | | | |
|---|---|---|---|
| 4,165,223 | 8/1979 | Powers | 65/2 |
| 4,217,027 | 8/1980 | MacChesney et al. | 350/96.3 |
| 4,335,934 | 6/1982 | Black et al. | 350/96.33 |
| 4,450,333 | 5/1984 | Andrejco et al. | 219/10.49 |
| 4,629,485 | 12/1986 | Berkey | 65/3.11 |
| 4,643,751 | 2/1987 | Abe | 65/DIG. 16 |
| 4,648,891 | 3/1987 | Abe | 65/DIG. 16 |
| 4,668,263 | 5/1987 | Yokota et al. | 65/DIG. 16 |
| 4,772,302 | 9/1988 | Abe | 65/DIG. 16 |
| 4,812,155 | 3/1989 | Kyoto et al. | 65/3.12 |
| 4,820,322 | 4/1989 | Baumgart et al. | 65/3.11 |
| 4,969,941 | 11/1990 | Kyoto et al. | 65/DIG. 16 |

FOREIGN PATENT DOCUMENTS

| | | |
|---|---|---|
| 0161680 | 5/1985 | European Pat. Off. ............ 37/18 |
| 5567533 | 5/1980 | Japan . |
| 5650136 | 5/1981 | Japan . |
| 6296339 | 5/1987 | Japan . |

OTHER PUBLICATIONS

"Fabrication of Optical Waveguides by the Outside Vapor Deposition Process", by P. C. Schultz, *Proceedings of the IEEE*, vol. 68, No. 10, Oct., 1980, pp. 1187–1190.

"Fluorine Doping in the VAD Method and Its Application to Optical Fiber Fabrication", by H. Kanamori, N. Yoshioka, M. Kyoto, M. Watanabe and G. Tanaka, in ECOC 83–9th European Conference on Optical Communication, Edited by H. Melchior and A. Sollberger, (Elsevier Science Publishers B. V. (North Holland), 1983), pp. 13–16.

*Primary Examiner*—Richard V. Fisher
*Assistant Examiner*—John J. Bruckner
*Attorney, Agent, or Firm*—R. B. Anderson

[57] ABSTRACT

A fluorine-doped silica soot cylinder (11) is consolidated by containing it within an encapsulation structure (29) within a furance (21). The atmosphere within the encapsulation structure is kept substantially stagnant during the consolidating, and the volume enclosed by the encapsulation structure (29) is only slightly greater than the volume of the soot cylinder (11). A gap (52) between the volume enclosed by the encapsulating structure and the furnace is kept small enough to impede gas flow to a sufficient extent that the atmosphere within the encapsulating structure (29) is substantially stagnant during consolidation. During consolidation, fluorine concentration within the encapsulation structure (29) is uniformly distributed within the soot cylinder (11).

11 Claims, 3 Drawing Sheets

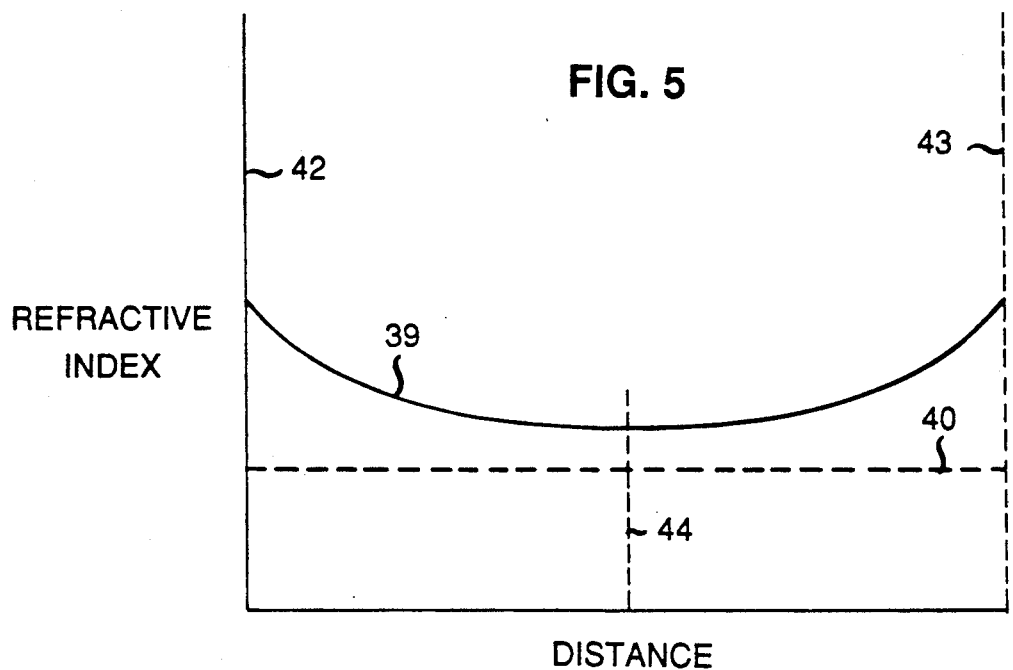
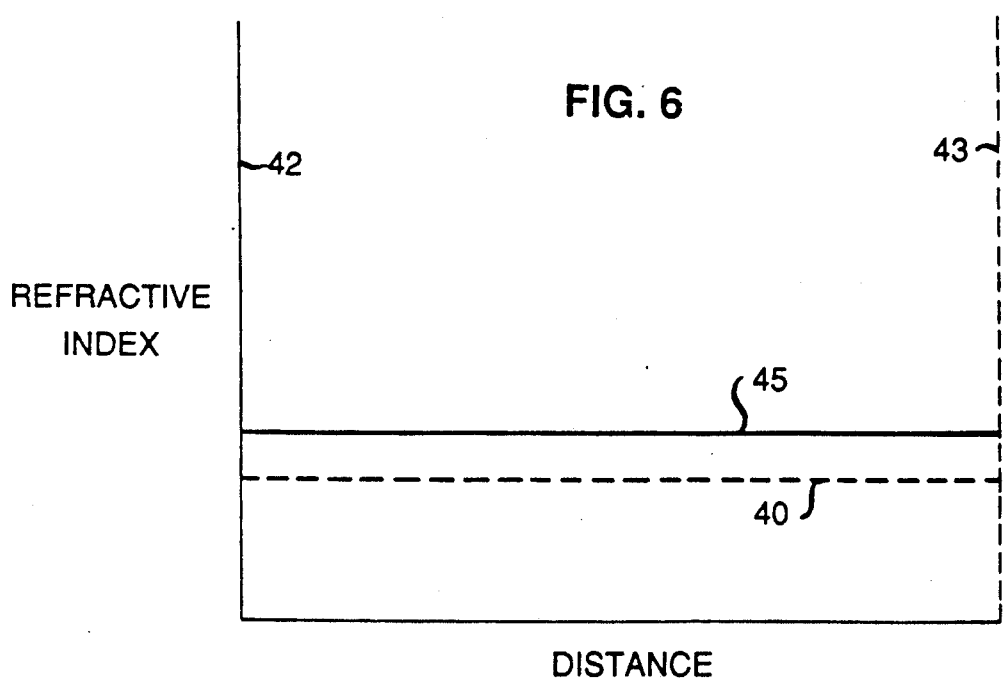

METHOD FOR CONSOLIDATING DOPED GLASS USING AN ENCAPSULATING STRUCTURE

This is a division of application Ser. No. 459,605 filed Jan. 2, 1990 now U.S. Pat. No. 4,968,339.

TECHNICAL FIELD

This invention relates the methods for making doped glass bodies and, more particularly, to methods for making a depressed refractive index outer claddings for optical fibers.

BACKGROUND OF THE INVENTION

Optical fibers have become increasingly important as a medium for transmitting large quantities of information in the form of lightwaves. Each optical fiber comprises a thin solid glass cylinder, known as the core of the fiber, surrounded by a glass sleeve, known as the cladding, which has a lower refractive index than the core. There are a number of ways of making optical fiber, one way being, first, to construct a glass tube, and then to vapor-deposit glass that will eventually constitute part of the cladding and the core on the inner surface of the glass tube by the method taught, for example, in the MacChesney, et al. U.S. Pat. No. 4,217,027 granted Aug. 12, 1980, now generally known as the modified chemical vapor deposition (MCVD) technique. When used in such manner, the glass tube is known conventionally as a substrate tube. After deposition, the entire structure is collapsed to make a preform rod, and glass drawing techniques are used to form a continuous optical fiber from the preform. The vapor deposited glass of the optical fiber may be doped so as to have a refractive index that is higher and/or lower than that of undoped glass; in any event, the refractive index of the core must be higher than that of the cladding layer for efficient transmission of lightwaves in the usual manner. One way of obtaining this difference is to dope the cladding layer with fluorine, which depresses the refractive index with respect to that of undoped glass (silicon dioxide).

For large preforms, an oversized core is deposited in the substrate tube and the collapsed preform rod is inserted into a second tube, called an overclad tube, that is collapsed onto the rod. This is the hybrid or "rod-in-tube" approach as described, for example, in the J. W. Baumgart, et al. U.S. Pat. No. 4,820,322, granted Apr. 11, 1989. One may likewise wish to dope such overclad tubes with fluorine to depress their refractive indices.

Both substrate and overclad glass tubes may be made, first, by depositing glass soot on a mandrel to form a cylindrical porous soot form of glass particulate. The deposited porous soot cylinder is then consolidated into a glass tube by heating the soot cylinder in a furnace. Prior to consolidation, fluorine can be introduced as a dopant by adding a fluorine containing gas to the reactant stream of the torch during soot deposition, or by adding a fluorine containing gas to the furnace atmosphere at a temperature below the consolidation temperature. During the consolidation step, preferential volatilization of fluorine from the porous cylindrical tube surfaces typically produces a non-uniform distribution of fluorine through the thickness of the consolidated glass tube. Such non-uniformities can cause problems with the efficiency of lightwave transmission and reproducibility of the fiber.

One approach to this problem is to consolidate glass soot previously doped with fluorine while flowing a fluorine-containing gas over it in the furnace. Another proposal, described in the Berkey, U.S. Pat. No. 4,629,485, granted Dec. 16, 1986, is to dope the previously undoped soot during the consolidation step by flowing fluorine gas about the heated soot cylinder before and during consolidation. We have found that it is difficult with either of these approaches to obtain the desired uniformity of fluorine doping through the thickness of the final tube; also, such processes increase the expense of production because the highly reactive fluorine, at the high temperature required for consolidation, inevitably damages various furnace parts during its use.

Accordingly, there is a well-recognized need in the industry for a convenient and inexpensive method for doping a glass tube destined to be the cladding layer of an optical fiber with a refractive index reducing, and highly reactive, dopant such as fluorine, in such manner that the reduced refractive index is substantially uniform through the thickness of the tube. There is also a need for such a method that does little or no damage to furnace parts.

SUMMARY OF THE INVENTION

In accordance with one embodiment of the invention, glass fiber with a depressed refractive index outer cladding is made by, first, depositing fluorine-doped silica soot on a mandrel by directing silicon-containing and fluorine-containing gases through a flame toward the mandrel. The porous soot cylinder is then consolidated by enclosing it within an encapsulation structure which is placed in a conventional furnace. The soot cylinder is heated sufficiently to consolidate it into a glass tube, but during this consolidation the encapsulation structure confines the fluorine gas to remain largely within the soot cylinder and thus within the final glass tube.

According to one feature of the invention, the atmosphere within the encapsulation structure is kept substantially stagnant during the consolidation step; that is, during consolidating, there is virtually no gas flow within or through the encapsulating structure. In accordance with another feature, the volume enclosed by the encapsulation structure is only slightly greater than the volume of the soot cylinder. As a consequence of these features, relatively little of the fluorine in the soot cylinder diffuses into the volume enclosed by the encapsulating structure before the gaseous concentration within the encapsulation structure is sufficient to inhibit further net volatilization of fluorine from the soot cylinder. We have found that, in prior art methods, it is an escape from the soot cylinder of fluorine dopant during consolidation that is primarily responsible for dopant non-uniformities in the substrate tube. By confining the fluorine gas, we limit the escape of fluorine from the soot cylinder. Moreover, as will be explained more fully below, whatever fluorine does escape does not lead to doping level non-uniformities because the fluorine gas in the encapsulation structure is caused to be of substantially equal concentration throughout the volume of the glass soot cylinder.

These and other aspects, features and benefits of the invention will be better understood from a consideration of the following detailed description taken in conjunction with the accompanying drawing.

BRIEF DESCRIPTION OF THE DRAWING

FIG. 5 is a graph of refractive index versus distance along a transverse section of a glass substrate tube made in accordance with the prior art;

FIG. 6 is a graph of refractive index versus distance along a transverse section of a glass substrate tube made in accordance with the invention;

DETAILED DESCRIPTION

It is to be noted that the drawings are illustrative and symbolic of the invention and the scale or relative proportion of the elements shown is not necessarily accurate. Further, it is to be noted that the present invention explicitly contemplates both single mode and multimode optical fiber lightguides, regardless of any specific description drawing or example set forth herein.

Figure 1:
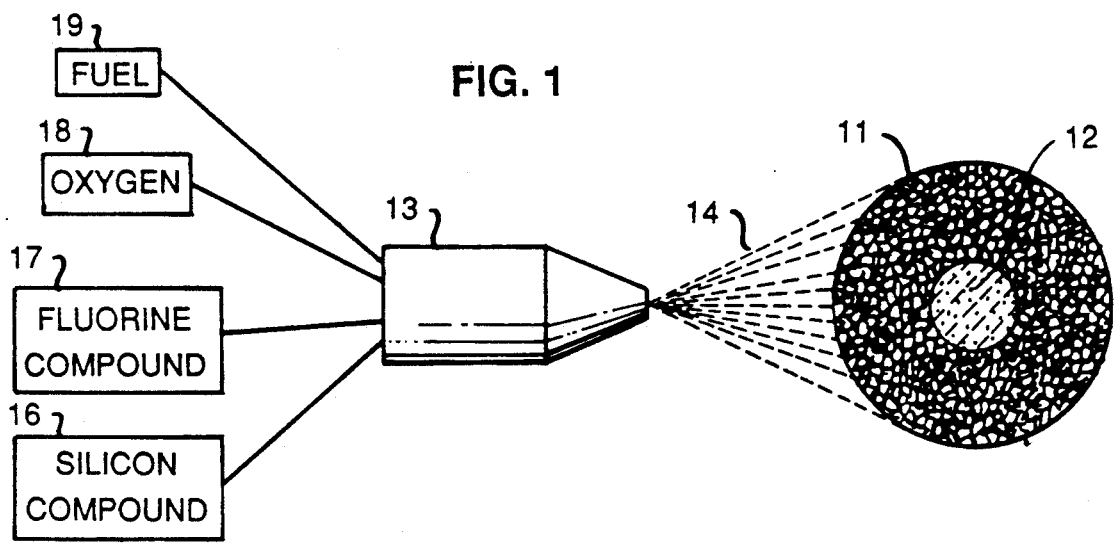
FIG. 1 is a schematic view of apparatus for making a soot cylinder that may be used in conjunction with an illustrative embodiment of the present invention.

Referring now to FIG. 1, there is illustrated a known method for forming a soot cylinder 11 on a mandrel 12 which may be used in conjunction with the invention. Gaseous components are mixed in a burner 13 which emits a flame 14 within which silicon may be reacted to form silicon dioxide (silica soot) that is deposited on the mandrel to constitute the soot cylinder 11. As is known in the art, a gaseous silicon-containing gas from a source 16, a fluorine-containing gas from a source 17, an oxygen-containing gas from a source 18 and gaseous fuel from a source 19, are combined in the burner or torch for projection toward the soot cylinder 11. As described, for example, in the aforementioned MacChesney et al. patent and in the paper, "Fabrication of Optical Wave Guides by the Vapor Deposition Process," by P. C. Schultz, *Proceedings of the IEEE*, Vol. 68, No. 10, October, 1980, pps. 1187–1190, any of various gases may be used as the silicon-containing, fluorine-containing, oxygen-containing and fuel gases. The silicon compound may illustratively be $SiCl_4$, the fluorine compound may be $SiF_4$, the oxygen may be $O_2$ and the fuel may be hydrogen.

Figure 2:
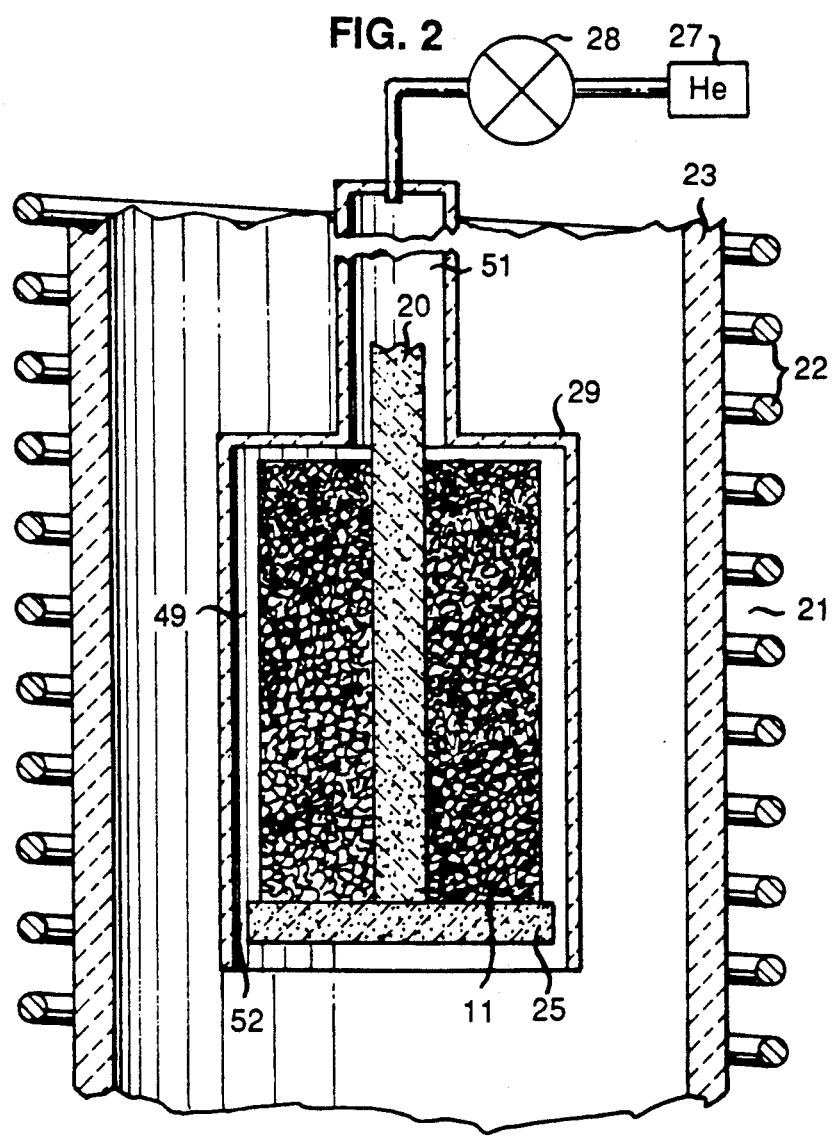
FIG. 2 is a schematic sectional view of apparatus in accordance with an illustrative embodiment of the invention for consolidating the soot cylinder made as shown in FIG. 1.

After its formation, the soot cylinder 11 (also sometimes known as a soot boule or soot form) is consolidated within a furnace 21 as shown in FIG. 2. The soot cylinder is supported by a mandrel 20, which may be either the same or different from the mandrel 12 of FIG. 1, and a pedestal 25. The furnace, as is well known, comprises heating elements 22 which may be in the form of a conductive coil or a plurality of conductors. It also typically includes a muffle 23, which is a cylinder of refractory material used for maintaining the heat balance within the furnace. Since such refractory materials are typically reactive to fluorine, these furnace parts are typically damaged by any of the prior art methods that use a flow of fluorine before or during the glass consolidation. Prior to consolidation, the soot cylinder is purged by flowing past it and through it helium from a source 27. This flow is shut off during consolidation, illustratively by a valve 28.

In accordance with the invention, during consolidation, the soot cylinder 11 is encased by a gas-impermeable encapsulation structure 29 which may be of quartz or a similar material that is unlikely to contaminate the porous soot cylinder 11. The volume enclosed by the encapsulation structure 29 is only slightly larger than the volume enclosed by the soot cylinder 11; preferably, the ratio of the volume enclosed by encapsulation structure 29 to the volume enclosed by the soot cylinder 11 is 1.4:1 or less (for purposes of this calculation, the mandrel volume is considered to be part of the soot cylinder volume). The purpose of the encapsulation structure 29 is to confine fluorine gases within the soot cylinder and to cause the atmosphere surrounding the soot cylinder to be substantially saturated with fluorine during consolidation, thereby to make a more uniform refractive index profile across the width of the consolidated glass tube.

Figure 3:
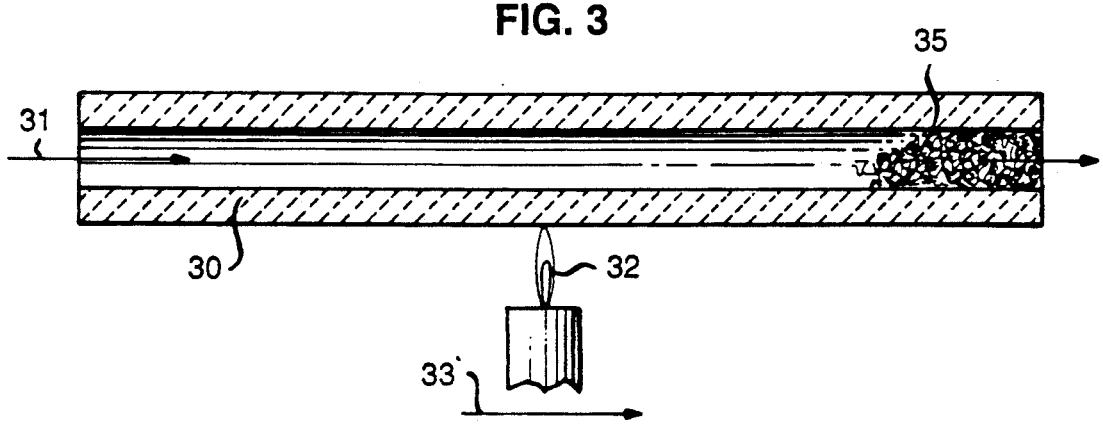
FIG. 3 is a schematic view of apparatus for depositing glass on the inner surface of a cylindrical substrate tube made by the apparatus of FIG. 2.

In accordance with one embodiment of the invention, after the soot cylinder 11 has been consolidated to form a solid glass tube, the mandrel 20 is removed and the tube is used as a substrate; that is, core material is deposited within the tube by the process shown schematically in FIG. 3. Although the tube may directly be used as a substrate tube, preferably the tube is drawn by conventional glass drawing techniques to increase its length and reduce its diameter prior to its use as a substrate tube. Substrate tube 30 is, of course, fluorine-doped glass made by the process of FIG. 2. As described in more detail in the aforementioned MacChesney et al. patent, a silicon-containing gas, together with an oxygen-containing gas, are introduced into the left end of the tube as shown by arrow 31. A flame 32 is moved axially along the tube as shown by arrow 33. The heat causes silicon to react with oxygen or oxygen-containing gas to form silicon dioxide particles which deposit on the inner wall of the substrate tube downstream from the flame. The high temperature flame traverses the area of deposited silica causing consolidation of the particles into a thin glass layer. Several layers are deposited in this manner until the desired composition profile and glass thickness are obtained. The deposited silicon dioxide (or silica) particles 35 may be undoped or may alternatively be doped (as known in the art) so as to have a different refractive index than that of undoped glass.

After complete deposition of glass on the interior of the substrate tube 30, the substrate tube 30 is collapsed into a solid cylindrical preform structure. The outer portion of the preform structure conforms in composition to the substrate tube 30, while the inner portion corresponds in composition to the deposited glass 35. Alternatively, according to the known "rod-in-tube" process, the cylindrical preform structure can be fitted into a larger overclad tube that is then collapsed to make a larger preform. Such overclad tube can be made by the process illustrated in FIG. 2.

After fabrication of the preform, the preform is placed in a furnace which heats and softens one end of it such that it may be grasped by a tool and drawn in the form of a partially-molten fiber. As is known in the art, the preform is progressively fed into the furnace as the fiber is drawn from the partially-molten end of the preform. A furnace for drawing an optical fiber from a preform is described, for example, in the Andrejco, U.S. Pat. No. 4,450,333 granted May 22, 1984, which, for reasons of brevity, is not shown and described herein. While the preform may have a diameter of 19 millimeters, the optical fiber is drawn to have a total diameter of typically only about 125 microns. The glass composition of the core of the fiber corresponds to that of the deposited soot 35 of FIG. 3 while the cladding level of the fiber ordinarily corresponds partly to the deposited particles 35 and also to the composition of substrate tube 30 (and thus of soot cylinder 11).

Figure 4:
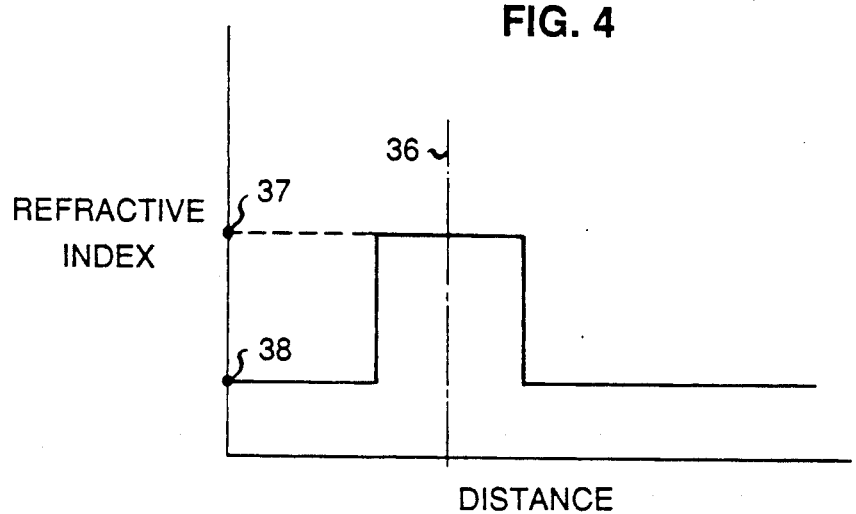
FIG. 4 is a graph of ideal refractive index versus distance along a transverse section of an optical fiber.

Referring to FIG. 4, which is a graphic representation of an ideal refractive index versus distance along the width of an optical fiber having a central axis at location 36, it is important for proper lightwave transmission that the refractive index 37 of the core of the fiber be higher than the refractive index 38 of the outer cladding of the fiber. This is because an interface having a good reflectivity must be formed between the cladding and the core of the fiber for light to be reflected appropriately during its transmission through the optical fiber. If the refractive index of the cladding level is non-uniform, or if the difference of refractive indices at the surface between the core and the cladding is not sufficiently great or is non-uniform in the axial direction, the optical fiber may not be capable of transmitting lightwaves as intended.

FIG. 5 is a graphic representation of refractive index through the wall of a substrate tube of the prior art in a direction perpendicular to its axis. Assuming that the substrate tube is doped with fluorine, the refractive index profile 39 varies inversely with doping. A reference profile 40 showing the refractive index of an ideal, uniformly-doped glass is included for reference purposes. Distance 42 is the outer surface of the tube, while distance 43 is the inner surface (the central axis of the tube would be to the right of distance 43). A problem with fluorine-doped substrates of the prior art is that, during consolidation, the fluorine doping tends to escape from the soot cylinder predominantly at is surfaces; thus, at the surfaces 42 and 43 of the substrate tube, the refractive index is less depressed than at a region 44 removed from the surfaces.

With the present invention, the encapsulation structure 29 limits the amount of fluorine dopant that escapes and insures that the dopant is uniformly distributed within the soot cylinder. Referring to FIG. 6, this results in a profile of 45 that differs only slightly from the ideal shown by curve 40. Moreover, note that the profile 45 is substantially uniform with respect to distance rather than being non-uniform as is profile 39 of FIG. 5.

Figure 7:
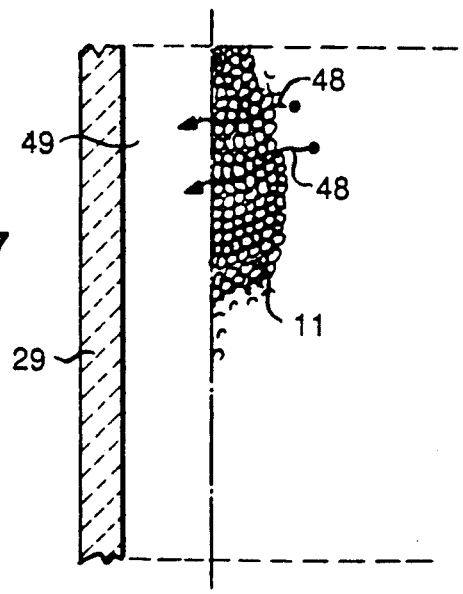
FIG. 7 is a schematic view of a portion of the soot cylinder and a portion of the encapsulation structure of FIG. 2.

FIG. 7 shows an enlarged section of part of the encapsulation structure 29 and soot cylinder 11 of FIG. 2. During the heating of the soot cylinder, fluorine molecules 48 from both the interior and surface regions of the soot cylinder diffuse into the gap 49 between the encapsulation structure 29 and the soot cylinder. The atmosphere in gap 49 is stagnant and so it quickly saturates with fluorine. During the remaining portion of the consolidation cycle, the number of fluorine molecules leaving the soot cylinder 11 is substantially compensated by the number of fluorine molecules returning to it from the enclosure atmosphere. Since there is no sink for fluorine molecules, the gas phase concentration tends toward uniformity along the entire width of the soot cylinder. The concentration gradient, or concentration difference, between fluorine in the soot cylinder and that in the gas phase is significantly reduced which significantly reduces further volatilization of fluorine from the cylinder. Preferential volatilization at the surfaces is substantially eliminated so that when the soot is collapsed into solid glass, the fluorine doping is uniform with respect to distance, as shown by profile 45 of FIG. 6. Moreover, we theorize that a uniform distribution of substantially stagnant gas-phase fluorine during consolidation tends to smooth out differences in dopant concentration in the original soot cylinder by making generally uniform any gradient between solid-phase and gas-phase fluorine along the volume of the cylinder. Given sufficient time the gas-phase fluorine will come into equilibrium with that in the soot cylinder, thus eliminating the driving force for further fluorine volatilization from the soot cylinder.

Referring to FIG. 6, the difference in refractive index between the actual profile 45 and the ideal profile 40 is a function of the volume of encapsulation structure 29 with respect to the volume of a soot cylinder 11. If the ratio of those volumes is very small, a relatively small proportion of the fluorine escapes from the soot cylinder before equilibrium is reached. Also, only a small time is required before a uniform fluorine distribution is achieved. We have found that, as a practical matter, encapsulation structure 29 can easily be made so that it encloses a volume which is only about 1.4 times the volume enclosed by soot cylinder 11. Other ratios could be used, however, depending on the extent to which one wishes to tolerate a longer time to reach a uniform fluorine distribution or a larger gap between the actual profile 45 and the ideal profile 40 of FIG. 6. Notice in FIG. 2 that a significant portion of the volume within the encapsulation structure is consumed by mandrel 20 which is relatively unreactive with fluorine.

Referring again to FIG. 2, since it is desired that the atmosphere within the encapsulation structure 29 be stagnant, the volume within structure 29 should ideally be hermetically sealed from the volume within furnace 23. We have found that, as a practical matter, design and operation of the structure is greatly simplified by allowing a gap 52 around its periphery to communicate between the furnace volume and the encapsulation structure volume. We have found that with gap 52 of about 0.2 centimeters, and in the absence of forced flow, there is a sufficient impedance to the transfer of gases from the encapsulation structure to the furnace volume that the atmosphere within the encapsulation structure remains substantially stagnant during consolidation. On the other hand, this small gap is sufficient to permit helium purging under pressure prior to consolidation as was described before, and also to allow for differences in thermal expansion and contraction during operation. A gap 51 of 0.2 centimeters also surrounds the mandrel 20.

In experimental versions that we have made, the encapsulation structure 29 had a length of fifty centimeters and an inner diameter of 14.4 centimeters. The supporting mandrel 20 had an outer diameter of 1.9 centimeters. The soot cylinder had an outer diameter of fourteen centimeters and axial length of forty centimeters, and it rested on a pedestal 25 having an outer diameter of 14.2 centimeters. Consolidation experiments resulted in refractive index profiles substantially as shown in FIG. 6.

While the invention has been discussed in the context of optical fiber fabrication, other optical devices require carefully controlled refractive indices, and for such purpose, the invention may offer advantages. In particular, the invention may be used to make fluorine-doped overclad tubes for use in the rod-in-tube process as was alluded to above. It can be appreciated from the forgoing that, because the invention does not involve any external flow of fluorine gases, there is little damage to various furnace elements and gas transmission apparatus. Escaped fluorine gas does corrode encapsulation structure 29, but since such gas is substantially stagnant, the corrosion is minimal and we have found that the structure 29 may be reused many times. One advantage of doping with fluorine during the soot-forming process illustrated in FIG. 1 is that the fluorine is confined to the delivery lines of burner 13 and to an exhaust and scrubbing system used in conjunction with the process of FIG. 1, both of which are more corrosion resistant than the furnace elements used during consolidation. However the doping is performed, consolidation in accordance with the invention may be of benefit. In principle, the invention may be beneficial for reducing loss of any gaseous dopant during consolidation of glass used for any purpose. Various other modifications and embodiments may be used by those skilled in the art without departing from the spirit and scope of the invention.

We claim:

1. A method for making fluorine-doped glass comprising the steps of directing a fluorine-containing gas and a silicon-containing gas through a flame toward a body such that fluorine-doped silica soot collects on the body;
    placing the soot within an encapsulating structure;
    placing the encapsulating structure within a furnace; and
    consolidating by heating the silica soot in a substantially stagnant atmosphere within the encapsulating structure to a sufficient temperature to consolidate, into solid glass, the fluorine-doped silica soot, said heating being in the absence of a forced gas flow into the encapsulating structure resulting in said substantially stagnant atmosphere within the encapsulating structure.

2. The method of claim 1 wherein:
    during the consolidation of the soot, some of the fluorine within the silica soot escapes to the volume enclosed by the encapsulating structure, and the fluorine within the atmosphere defined by the encapsulating structure is substantially uniformly distributed.

3. The method of claim 2 wherein:
    the fluorine-containing gas is $SiF_4$.

4. The method of claim 1 wherein:
    the ratio of the volume enclosed by the encapsulating structure to the volume of the silica soot is less than 1.4:1, whereby only a small amount of the dopant is released into the volume enclosed by the encapsulating structure before said amount of dopant reaches an equilibrium condition between fluorine volatilizing from the soot and fluorine entering the soot.

5. The method of claim 4 wherein:
    the encapsulating structure is contained within a furnace volume and the volume enclosed by the encapsulating structure communicates with the furnace volume by gaps having a sufficiently high impedance to gas transfer to cause any fluorine dispersed into the volume contained by the encapsulating structure to be substantially confined within the encapsulating structure.

6. A method for making doped glass comprising the steps of:
    forming a glass soot member;
    impregnating the glass soot member with a dopant that is gaseous at an elevated temperature;
    enclosing the glass soot member in a substantially gas-impermeable encapsulating structure, wherein a gap between the encapsulating structure and the glass soot member defines a volume that is less than four-tenths the volume of the soot member;
    heating the soot member in a substantially stagnant atmosphere within the encapsulating structure to a sufficient temperature to consolidate the soot member into a solid glass member, the heating being in the absence of a forced gas flow into the encapsulating structure resulting in said substantially stagnant atmosphere within the encapsulating structure.

7. The method of claim 6 wherein:
    the dopant is fluorine.

8. The method of claim 7 wherein:
    the glass soot is formed by flame hydrolysis;
    and the dopant is impregnated into the glass soot member by including a fluorine-containing gas in the flame hydrolysis process.

9. The method of claim 8 wherein:
    during consolidation of the soot cylinder, some of the fluorine within the glass soot member escapes to the volume enclosed by the encapsulating structure, and the fluorine within the atmosphere defined by the encapsulating structure is substantially uniformly distributed.

10. The method of claim 8 wherein:
    the soot member has the shape of a cylinder; and
    a mandrel extends through the cylinder in the encapsulating structure, whereby the solid glass member has the shape of a glass cylinder.

11. The method of claim 8 wherein:
    the fluorine-containing gas is $SiF_4$.

* * * * *